May 30, 1933. D. W. STRAIT 1,911,591
RIBBON FORMING MECHANISM FOR GLASS WORKING MACHINES
Filed June 12, 1930 3 Sheets-Sheet 1

INVENTOR
Donald W. Strait.
BY
ATTORNEY

May 30, 1933.  D. W. STRAIT  1,911,591
RIBBON FORMING MECHANISM FOR GLASS WORKING MACHINES
Filed June 12, 1930   3 Sheets-Sheet 3
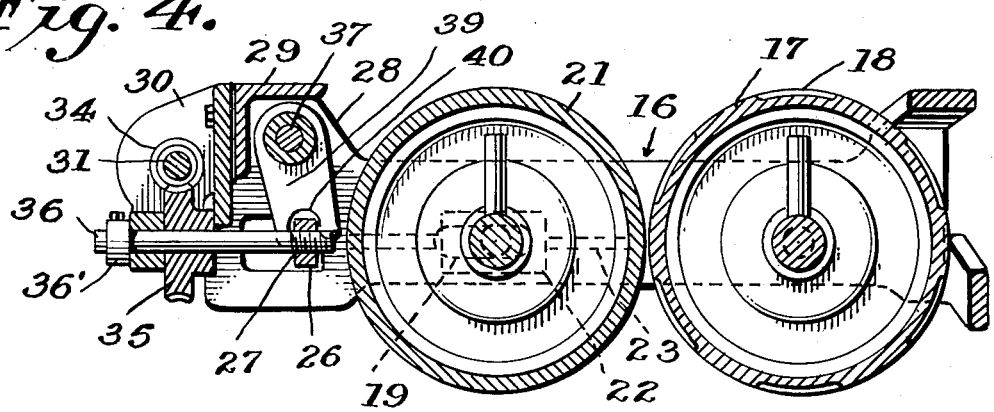
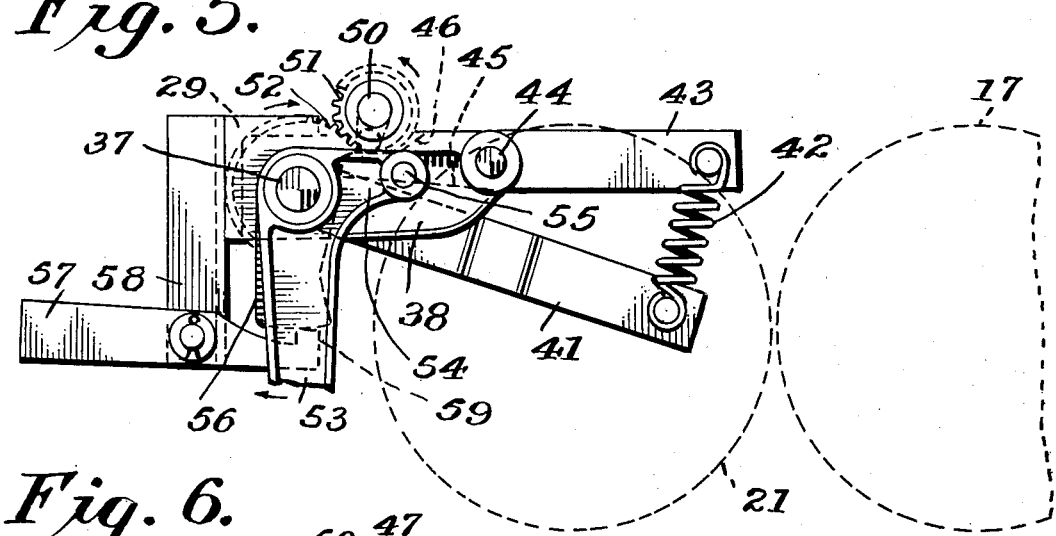
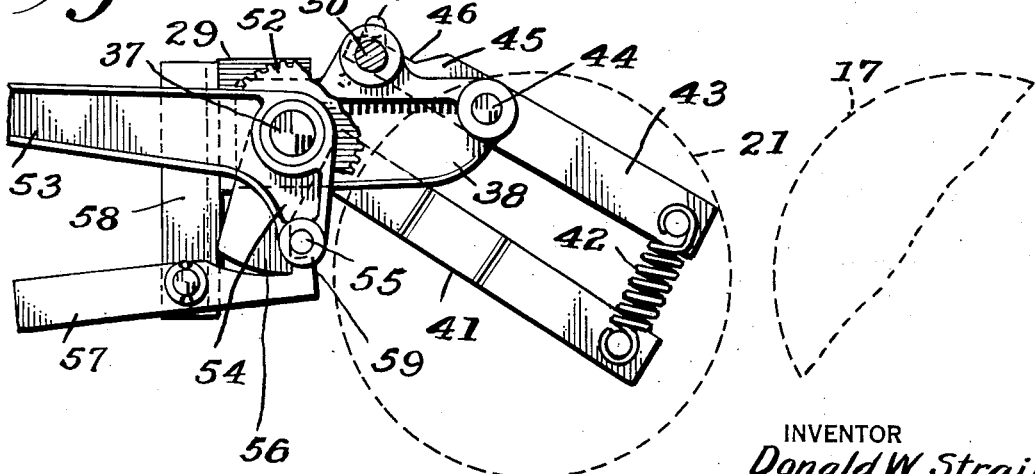
INVENTOR
*Donald W. Strait.*
BY
ATTORNEY Patented May 30, 1933

1,911,591

UNITED STATES PATENT OFFICE

DONALD W. STRAIT, OF CORNING, NEW YORK, ASSIGNOR TO CORNING GLASS WORKS, OF CORNING, NEW YORK, A CORPORATION OF NEW YORK

RIBBON FORMING MECHANISM FOR GLASS WORKING MACHINES

Application filed June 12, 1930. Serial No. 460,658.

This invention relates to glass working machines and more particularly to a ribbon forming mechanism such as is employed on glass working machines of the type disclosed in a co-pending application filed by William J. Woods and David E. Gray on April 13, 1927, Serial No. 183,491.

The object of the present invention is to avoid jamming the ribbon forming rolls should a hard body attempt to pass between them.

Another object is to enable the rolls to be easily and quickly released and reset without necessitating their readjustment.

The above and other objects may be accomplished by employing my invention which embodies among its features a pair of ribbon forming rolls one of which is held in yieldable relation to the other to form a ribbon forming pass, and means for releasing the yielding pressure on the yieldably held roll and subsequently withdrawing it from pass forming relation with the other roll.

In the drawings:

Fig. 4 is a sectional view taken on the line 4—4 of Fig. 2;

Fig. 5 is an enlarged detail side view in elevation of a fragment of the roll release mechanism, showing the relative position of the parts when the rolls are in ribbon forming relation; and Fig. 6 is a view similar to Fig. 5 showing the relative position of the parts when the rolls are in released position.

Figure 1:
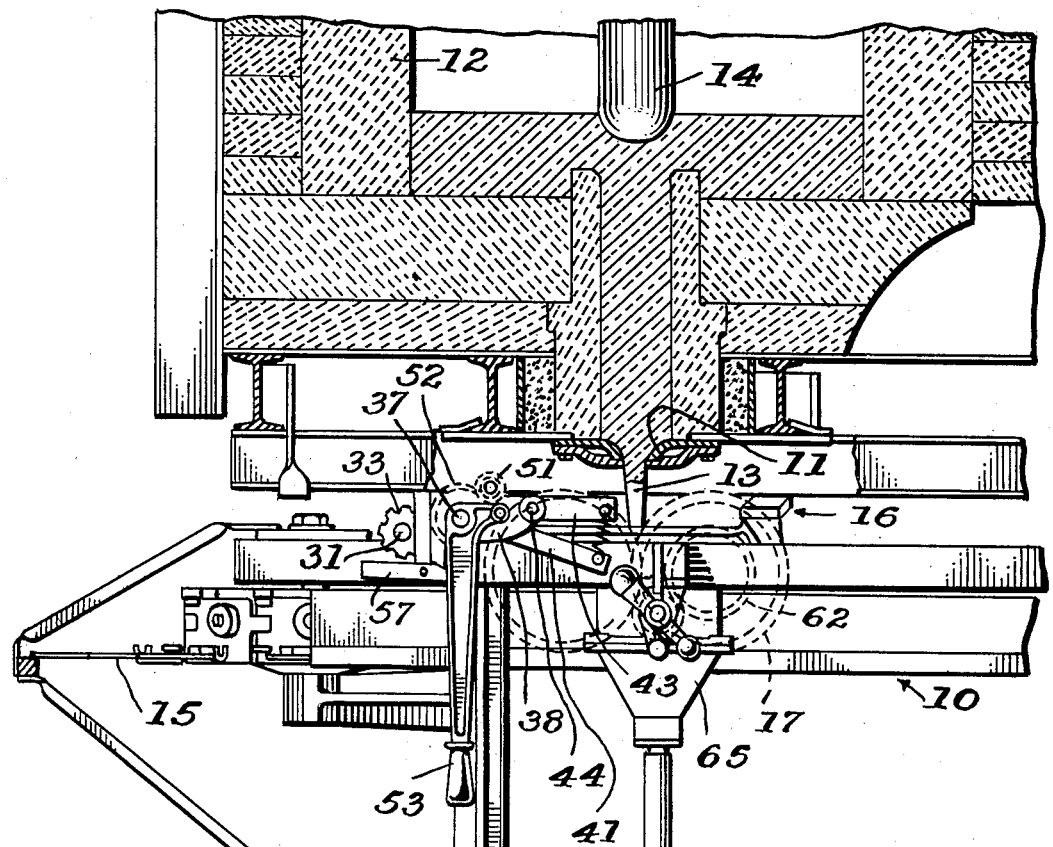
Fig. 1 is a side view in elevation of a fragment of a glass working machine employing my improved roll release mechanism and showing it associated with a typical glass feeder.
Figure 3:
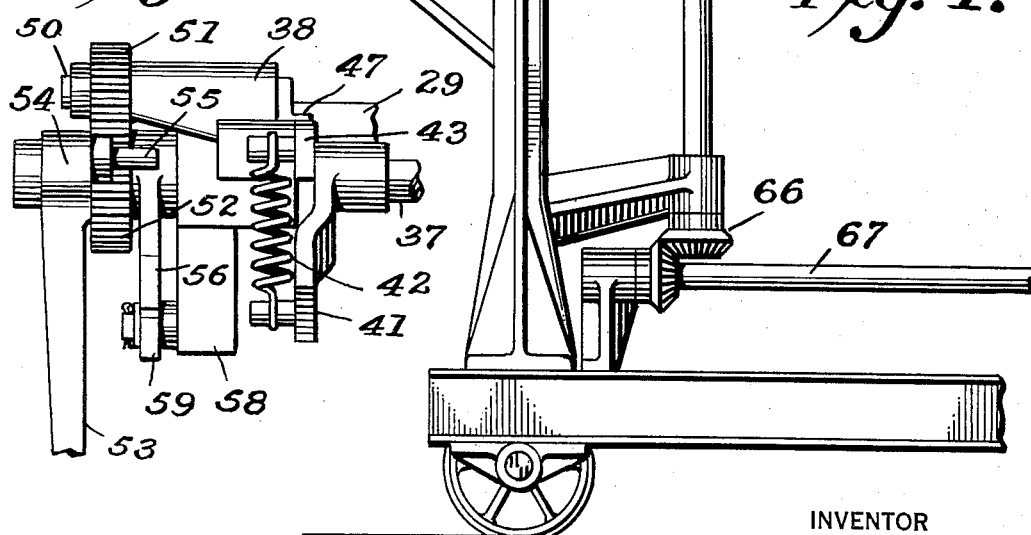
Fig. 3 is an enlarged front view of the outer end of the release and control mechanism.

Referring to the drawings in detail, the glass forming machine 10 is located beneath the discharge orifice 11 of a feeder bowl 12 from which a stream of molten glass 13 flows downwardly between the ribbon forming rolls of the glass forming machine 10. The rate of flow of the glass stream is regulated by means of a refractory needle 14 which is adjustably supported in the usual manner over the orifice 11. The glass stream 13 upon passing between the forming rolls is deposited upon orifice plates 15 of the glass forming machine 10 as they travel beneath the orifice. The details of this operation are disclosed in the Woods and Gray application above referred to and since they form no part of the present invention no further disclosure is here made.

Figure 2:
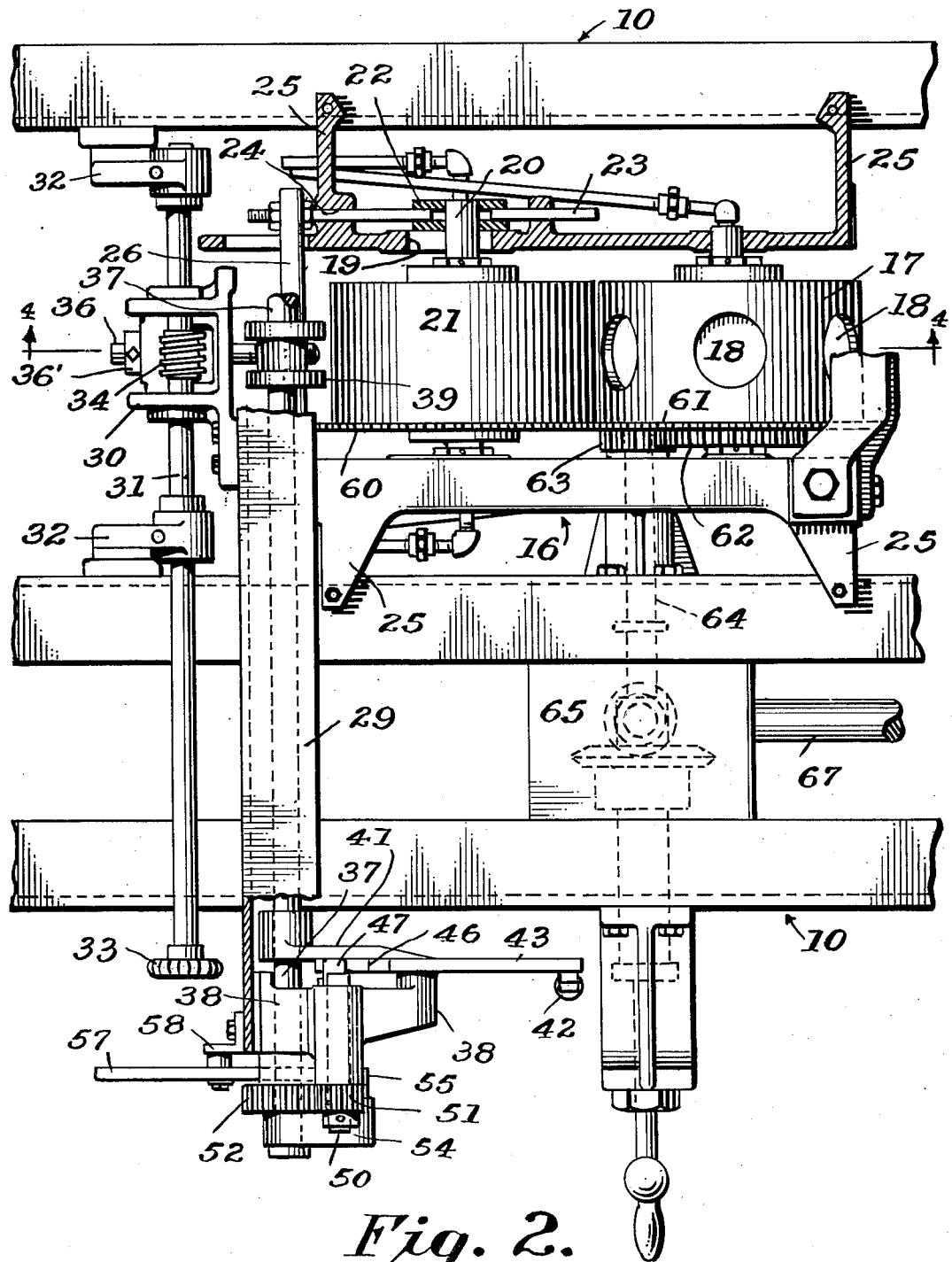
Fig. 2 is an enlarged top plan view of a fragment of the glass working machine shown in Fig. 1, a portion of the roll supporting frame being shown in section to more clearly illustrate the details of construction.

Resting on the frame of the machine 10 directly beneath the orifice 11 is a frame 16 and mounted for rotary motion between the side bars of the latter is a ribbon forming roll 17. This roll may or may not be formed with pockets 18 for forming bosses on the ribbon as the glass stream contacts with it. Formed in the side bars of the frame 16 in spaced relation to the axis of the roll 17 are longitudinally extending slots 19 (Fig. 2) through which the trunnions 20 of a cooperating ribbon forming roll 21 extend. The trunnions 20 are journalled in blocks 22 which are carried on rods 23, the latter being mounted for longitudinal sliding movement in openings 24 formed in certain of the frame supporting members 25. Connecting the ends of the rods 23 which extend through the openings 24 is a cross bar 26 which is formed intermediate its ends with a screw threaded opening 27 (Fig. 4). Secured to upstanding brackets 28 formed adjacent the slotted ends of the side bars of the frame 16, is a supporting bar 29 which extends toward the operator's side of the machine and serves to support the tensioning mechanism to be more fully hereinafter described. A bifurcated bracket 30 is secured to the bar 29 in longitudinal alignment with the rolls 17 and 21 and journalled in the arms of this bracket is a shaft 31 which serves the purpose of a pivot around which the entire roll supporting mechanism may swing and also as an element of the means by which the forming rolls may be adjusted. This shaft 31 is rotatable through brackets 32 carried by the frame of the machine 10 so as to fix the relation of the roll carrying frame 16 on the machine.

Secured to the outer end of the shaft 31 is a hand wheel 33 and keyed to the shaft between the arms of the bifurcated bracket 30 is a worm 34 which meshes with a worm gear 35 (Fig. 4) which is splined to a stub shaft 36 which is mounted for rotary motion in the bracket 30 in longitudinal alignment with the threaded opening 27 in the bar 26. The inner end of the shaft 36 is threaded for cooperation with the threaded opening 27 while its outer end is provided with a stop collar 36' for engagement with the end of the bracket 30 whereby its longitudinal movement toward the roll 17 is restricted. Thus it will be seen that by turning the hand wheel 33 in one direction the cross bar and its attendant mechanism including the roll 21 may be retracted with relation to the roll 17 and to enlarge the forming pass through which the glass passes. Restriction of the forming pass is accomplished by reversing the direction of rotation of the shaft 31 which allows the roll 21 to move toward the roll 17 under the influence of the tensioning mechanism to be more fully hereinafter described.

Mounted for rocking motion in the upstanding brackets 28 is a rock shaft 37 whose outer end is supported in a bracket 38 carried at the outer end of the supporting bar 29. Secured to the rock shaft 37 adjacent opposite sides of the stub shaft 36 are lever arms 39 whose free ends are bifurcated as at 40 to receive the cross bar 26. Attached to the rock shaft 37 near its outer end is a tension lever 41 to the free end of which is attached a retractile coiled spring 42. The end of the spring opposite that which is attached to the lever 41 is connected to the outer end of an arm 43 which is pivoted at 44 to the bracket 38. The arm 43 is provided with an extension 45 which is formed with a cam face 46 for engagement with a cam 47. This cam is carried on the end of a shaft 50 which is journalled in the bracket 38 and attached to the end of the shaft 50 is a pinion 51 which meshes with a pinion 52, the latter being mounted for rotary motion around and independently of the rock shaft 37. Formed integrally with the pinion 52 is a hand lever 53 carrying an arm 54 whose free end is provided with a laterally extending stud 55 for engagement with a latch arm 56 which is fixed to the rock shaft 37. A latch 57 is pivoted to a bracket 58 which depends from the supporting bar 29 and is provided with a latch finger 59 for engagement with the latch arm 54 when it is desired to hold the device in released position. It will thus be seen that when the hand lever 53 is in normal position, i.e. as shown in Fig. 5, the cam 47 holds the arm 43 in elevated position, thus exerting yielding pull on the tension arm 41 which tends to rotate the rock shaft 37 counter clockwise. Such tendency on the part of the rock shaft 37 causes the lever arms 39 to exert yielding tension on the shaft 36. The engagement of the stop collar 36' with the bracket 30 prevents the shaft 36 from moving toward the roll 17 beyond a predetermined point and yet permits its free movement in the opposite direction.

The driving of the rolls is accomplished by providing the rolls with gears 60 and 61 the teeth of which mesh when the rolls are in operative relation. In addition to the gear 61, the roll 17 is provided with a gear 62 which meshes with a driving pinion 63 carried by a drive shaft 64. This drive shaft is connected through a suitable control mechanism and gear train 65 and 66 respectively to the main drive shaft 67 of the glass working machine.

The operation of the device is as follows, the hand wheel 33 is turned so as to impart rotary motion to the shaft 31. Such motion is imparted through the worm 34 and worm wheel 35 to the shaft 36 which by reason of its threaded end meshing with the threads in the opening 27 causes the cross bar 26 to move longitudinally of the shaft 36. Such adjustment of the cross bar 26 on the shaft 36 causes the rods 23 to move accordingly and hence the roll 21 may be adjusted with relation to the roll 17. Under normal conditions the rolls are yieldably held in their adjusted position by the spring 42 which by exerting pull on the tension arm 41 tends to rotate the rock shaft 37 in a counter clockwise direction so as to urge the free ends of lever arms 39 toward the roll 17. This causes yielding pressure to be exerted on the cross bar 26 and thus yieldingly maintains the roll 21 in its furthest advanced position with relation to the roll 17. Advance of the roll 21 toward the roll 17 beyond a predetermined point is prevented by the engagement of the stop collar 36' with the bracket 30, as will be clearly seen upon reference to Fig. 4.

Should a hard unyielding object such as a stone or piece of refractory attempt to pass between the ribbon forming rolls 17 and 21, the roll 21 will move away from the roll 17 against the tension of the spring 42. Hence small stones or the like can do no harm to the rolls. There are times however when it is desirable to separate the rolls and keep them apart as when an unusual amount of bad glass is encountered. This may be accomplished by moving the hand lever 53 from its normal position, as shown in Fig. 5, in a clockwise direction. Such movement rotates the pinion 51 in a counter clockwise direction so as to swing the cam 47 over the cam face 46 and into the position shown in Fig. 6. This permits the arm 43 to swing downwardly around its pivot 44 so as to release the tension on the spring 42 and the tension arm 41. Continued movement of the hand lever 53 brings the stud 55 into engagement with the arm 54 and causes the rock shaft 37 to rock in its bearings and move the lever arms 39 in a direction to retract the roll 21. This is all accomplished without affecting the adjustment of the rolls so that restoration of the device to operative position can be effected by a simple reversal of the operation.

While in the foregoing there has been shown and described a preferred embodiment of this invention it is to be understood that minor changes in the details of construction, combination, and arrangement of parts may be resorted to without departing from the spirit and scope of the invention as claimed.

What I claim is:

1. In a glass working machine, a pair of ribbon forming rolls one of which is held under yielding pressure in ribbon forming relation to the other, and means which by a single movement will release the yielding pressure and thereafter move the yieldably held roll away from the other roll.

2. In a glass working machine, a pair of ribbon forming rolls one of which is adjustably held under yielding pressure in ribbon forming relation to the other, and means which by a single movement will release the yielding pressure and thereafter move the yieldably held roll away from the other roll without changing the adjustment.

3. In a glass working machine, a pair of ribbon forming rolls one of which is held under yielding pressure in ribbon forming relation to the other, means which by a single movement will release the yielding pressure and thereafter move the yieldably held roll away from the other roll, and means for holding the yieldably held roll in such position.

4. In a glass working machine, a pair of ribbon forming rolls one of which is held under yielding pressure in ribbon forming relation to the other, independently controlled means for adjusting the position of the yielding roll to vary the size of the ribbon which is formed by the passing of glass between the rolls and means which by a single movement will release the yielding pressure and thereafter move the yieldably held roll away from the other roll.

5. In a glass working machine, a pair of ribbon forming rolls one of which is held under yielding pressure in ribbon forming relation to the other, independently controlled means for adjusting the position of the yielding roll to vary the size of the ribbon which is formed by the passing of glass between the rolls, means which by a single movement will release the yielding pressure and thereafter move the yieldably held roll away from the other without altering the roll adjusting means, and means for holding the yielding roll in its retracted position.

6. In a glass working machine, a pair of ribbon forming rolls one of which is movable toward or away from the other, means for yieldably holding the movable roll in its furthest advanced position and means which by a single movement will release the yieldable holding means and thereafter retract the movable roll.

7. In a glass working machine, a pair of ribbon forming rolls one of which is movable toward or away from the other, means for restricting the advance of the movable roll toward the other, means for yieldably holding the movable roll in its furthest advanced position, means which by a single movement will release the yieldable holding means and thereafter retract the movable roll, and means for holding the movable roll in its retracted position.

8. In a glass working machine, a pair of ribbon forming rolls one of which is movable toward or away from the other, a yoke connected to the movable roll, means to restrict the advance of the movable roll toward the other, yieldable means connected to the yoke for holding the movable roll in its furthest advanced position and means which by a single movement will release the yieldable means and thereafter retract the movable roll.

9. In a glass working machine, a pair of ribbon forming rolls one of which is movable toward or away from the other, a yoke connected to the movable roll, means to restrict the advance of the movable roll toward the other, yieldable means connected to the yoke for holding the movable roll in its furthest advanced position, means which by a single movement will release the yieldable means and thereafter retract the movable roll and means for holding the movable roll in retracted position.

10. In a glass working machine, a pair of ribbon forming rolls one of which is movable toward or away from the other, a yoke connected to the movable roll, adjustable means cooperating with the yoke to restrict the advance of the movable roll toward the other, yieldable means connected to the yoke for holding the movable roll in its furthest advanced position and means which by a single movement will release the yieldable means and thereafter retract the movable roll.

11. In a glass working machine, a pair of ribbon forming rolls one of which is movable toward or away from the other, a yoke connected to the movable roll, adjustable means cooperating with the yoke to restrict the advance of the movable roll toward the other, yieldable means connected to the yoke for holding the movable roll in its furthest advanced position, means which by a single movement will release the yieldable means and thereafter retract the movable roll and means for holding the movable roll in retracted position.

12. In a glass working machine, a pair of ribbon forming rolls one of which is movable toward or away from the other, a yoke connected to the movable roll, an adjustable stop cooperating with the yoke to restrict the advance of the movable roll toward the other roll, a rock shaft, means on the rock shaft for moving the yoke and advancing or retracting the movable roll, yieldable means for urging the rock shaft to move in a direction to advance the movable roll and means which by a single movement will release the yieldable means and thereafter move the rock shaft to retract the movable roll.

13. In a glass working machine, a pair of ribbon forming rolls one of which is movable toward or away from the other, a yoke connected to the movable roll for controlling its movements, an adjustable stop cooperating with the yoke to restrict the advance of the movable roll toward the other roll, a rock shaft, means on the rock shaft for moving the yoke and advancing or retracting the movable roll, a lever on the rock shaft, a spring connected to the free end of the lever for exerting rotary movement on the rock shaft in a direction to urge the movable roll toward the other roll, and means which by a single movement will release the tension on the spring and thereafter move the moving roll away from the other roll.

14. In a glass working machine, a pair of ribbon forming rolls one of which is movable toward or away from the other, a yoke connected to the movable roll for controlling its movements, an adjustable stop cooperating with the yoke to restrict the advance of the movable roll toward the other roll, a rock shaft, means on the rock shaft for moving the yoke and advancing or retracting the movable roll, a lever on the rock shaft, a spring connected to the free end of the lever for exerting rotary movement on the rock shaft in a direction to urge the movable roll toward the other roll, and a lever pivoted to the frame of the machine near the rock shaft, the free end of said lever being connected to the spring and manually controlled means for moving the lever into spring tensioning or tension relieving position.

15. In a glass working machine, a pair of ribbon forming rolls one of which is movable toward or away from the other, a yoke connected to the movable roll for controlling its movements, an adjustable stop cooperating with the yoke to restrict the advance of the movable roll toward the other roll, a rock shaft, means on the rock shaft for moving the yoke and advancing or retracting the movable roll, a lever on the rock shaft, a spring connected to the free end of the lever for exerting rotary movement on the rock shaft in a direction to urge the movable roll toward the other roll, a lever pivoted to the frame of the machine near the rock shaft, the free end of said lever being connected to the spring, manually controlled means for moving the lever into spring tensioning or tension relieving position and said means also serving to move the rock shaft to retract the movable roll after relieving the spring tension.

DONALD W. STRAIT.